Patented May 4, 1954

2,677,645

UNITED STATES PATENT OFFICE 2,677,645

DEXTRAN ROENTGENOGRAPHIC PREPARATION

Abbott W. Allen, Caldwell, N. J., assignor to Schering Corporation, Bloomfield, N. J., a corporation of New Jersey No Drawing. Application August 11, 1950, Serial No. 179,000

10 Claims. (Cl. 167—95)

The present invention relates to preparations for use in roentgenography for producing contrast in the X-ray examination of the blood vessels and of various organs and cavities of the body.

In the roentgenographic observation of the blood vessels and of various organs by the injection of water-soluble contrast agents, difficulty is experienced in the taking of X-ray pictures because of the speed with which the injected contrast agent travels through the blood vessels owing to the circulation of the blood. Because of this rapid removal of the contrast agent from the site of injection and its rapid and progressive dilution, the X-ray picture must be taken in a matter of seconds after the injection. This is a great inconvenience even to the highly skilled physician or technician.

Various attempts have been made to provide a composition whose rate of diffusion in the blood stream and speed of absorption are sufficiently slow to enable X-ray pictures to be taken without haste. However, the composition had at the same time to meet various other requirements before it could safely and reliably be employed for the stated purpose. It must have, in addition to slow diffusibility and absorption, also the properties of non-toxicity, adequate wetting power, quick elimination from the region of administration after the X-ray examination, etc. These necessary properties have generally proved contradictory in character, and it has been found that a material having one desirable feature is at the same time deficient in another desirable or necessary feature. Thus for many years iodinated and/or brominated vegetable oils have been used for bronchography, hysterosalpingography, visualization of the sinuses and other cavities. These materials, being rather viscous oily preparations, have the desirable property of slow diffusibility and absorption, but, on the other hand, they lack the wetting characteristics which are essential for proper delineation of details in the various organs and cavities. Moreover, these oily substances represent foreign substances which are excreted very slowly, and in many instances disturb the protein-bound iodine levels of the blood for extended periods. A further difficulty encountered in the use of these oily substances is that, owing to their physical characteristics, they tend to entrap air, giving rise to shadows which result in poor diagnosis. Thus, the use of an oily diagnostic agent which contains entrapped air bubbles can lead to a diagnosis of stones in the bile ducts where none actually exist. It is known also that the oily preparations used in bronchography have developed paraffinoma due to their non-absorbability and local irritant action. In order to overcome these disadvantages of oily preparations, attempts have been made to use gelatin, polyvinyl alcohol, carboxymethyl cellulose and other polymeric products of this type. However, all of these materials have distinct disadvantages, particularly where the possibility exists that they will be absorbed into the blood stream. All of them represent foreign substances to which the body mechanism finds it difficult to adjust itself, with the result that untoward reactions occur.

I have found that by dissolving water-soluble contrast agents in an aqueous solution or suspension of a polymer of glucose, a preparation is obtained which, on injection, remains for a sufficiently long time at the site of injection to enable X-ray photographs to be taken without the necessity for haste. The aqueous suspension of the contrast agent and glucose polymer forms a relatively sluggish mass which only slowly moves or diffuses away from the site of injection. In time, however, and where a sufficient amount of the preparation has been injected, it will be carried into various organs of the body which can then be subjected to X-ray examination and photography. The preparation can thus be used for the examination not only of the blood vessels, but also of lungs and kidneys and even the heart. I have found further that the combination of the contrast agent with the glucose polymer is no more toxic than the contrast agent alone and that in fact the incidence of shock or discomfort to the patient is reduced as compared with the injection of aqueous solutions of the contrast agent alone, particularly as the volume of solution to be injected can be reduced in the case of solutions containing the glucose polymer. I have found also that the glucose polymer is compatible with the various water-soluble contrast agents commonly employed at the present time such as "Neo-Iopax" (sodium salt of 3,5-diiodo chelidamic acid), and "Diodrast," "Hippuran" and "Urokon" (sodium-2,4,6-triiodo-3-monacetylaminobenzoate). The contrast agents, which are usually carboxylic acids, can be in the form either of their alkali metal salts or of their amine and alkylolamine salts, such as their dimethylamine and ethanolamine salts. The solutions of glucose polymer and contrast agent are characterized by a much lower speed of mixing with the blood stream than the usual aqueous solutions of the contrast agents, so that the concentration of the contrast agent is maintained high for a considerable period of time, and X-ray photographs and X-ray visualization with better contrast per given dose are obtained. The preparations of the present invention are marked also by a greatly reduced speed of absorption through the mucous or other surface membranes of the various cavities of the body, so that prolonged visualization in the case of uterine salpingography, myelography, bronchography, etc. can be obtained therewith. For the examination of these cavities, the aqueous preparation can be sprayed in known manner onto the surfaces to be examined, or the cavities can be filled with the solution.

The glucose polymer, which in the preparation of the present invention acts as a retardant in the adsorption, diffusion and rate of travel of the contrast agent, is one preferably having an average molecular weight not considerably greater than that of the albumens of the blood stream, and may have an average weight considerably below such value. Thus while it may have an average molecular weight as high as 75,000 or more, an average molecular weight of 40,000 to 60,000, or even lower will be entirely satisfactory in many cases. Thus it may be composed for the greater part of molecules which will pass the glomerular filter, in which case the danger of even mild kidney damage is substantially completely eliminated. The glycose polymer is preferably prepared by partial de-polymerization or degradation, followed by fractionation, of the highly polymeric glucose known as dextran and prepared, for example, by the action of Leuconostoc mesenteroide in a sucrose-phosphate medium from which the glucose polymer is ultimately removed and purified. By partial hydrolysis with acid the original molecular weight of approximately 200,000 can be reduced to about 75,000 and below. The so partially degraded polymer contains a relative wide range of molecular sizes, and the fraction having a mean molecular size of about 40,000 to 60,000 or 70,000 can be separated by treating the aqueous solution with acetone or other water-miscible organic solvent. While the mean molecular weight of the dextran can range from about 25,000 to as much as 200,000 or more where the diagnostic preparation is charged into a cavity, such as the bladder, in which there is very little or no absorption into the blood stream, and the preparation is discharged from the body within a relatively short time, it is important to utilize a polymer of the lower range of molecular sizes, say about 25,000 to about 70,000, where the diagnostic preparation either is injected into the blood stream or is charged into cavities or regions of the body from which it is not normally discharged in the regular functions but must be absorbed into the blood stream for ultimate elimination. These regions include the lungs, abdominal cavities, etc.

Where the radiopaque preparation is to be sprayed onto various surfaces (as distinguished from the filling of a cavity) the viscosity of the preparation should be adjusted to enable a relatively thick film to adhere to the surfaces for a sufficient length of time to permit X-ray examination before the solution is absorbed to any large extent. The viscosities can be adjusted for the different polymers by suitably varying the concentration of the latter.

The glucose polymers employed in the present invention are chemically rather inert substances, and so can be used with all types of water-soluble non-toxic compounds, having a radiopaque element (such as iodine and bromine). My improved preparations are employed for visualization, on the one hand, of the blood vessels and of the lungs and other highly vascular regions, or, on the other hand, of the urinary bladder, sinuses and other regions where the rate of absorption is low, depending upon the character of the contrast agent. As the polymer of larger molecular size is more difficult to eliminate through the kidneys, I prefer in general, as indicated above, to employ the relatively lower molecular weight polymers; but where the rate of absorption is low, the required rate of elimination will be correspondingly low, so that the higher molecular weight polymers can safely be used.

The glucose polymers employed by me have the important advantage over oily materials heretofore utilized in that whereas the latter are hydrophobic substances, the former are hydrophilic in character and so can be more quickly disposed of by the eliminating mechanism of the body when they are absorbed into the blood stream. As against the known hydrophilic substances, like gelatin, polyvinyl alcohol and the like, the glycose polymers have the advantage that they are not as foreign to body chemistry and are generally less toxic. Where the preparations are employed for spraying of various mucous or other surfaces of the body or in the filling of cavities, the molecular weight will be selected with the end in view that the rate of absorption into the blood stream, where such takes place, is not so rapid as to interfere with the X-ray examination.

The following are examples of preparations in accordance with the invention for intravenous injection, for the spraying onto the surfaces of body membranes or cavities, or for the filling of cavities.

*Example I*

80 cc. of disodium N-methyl-3,5-diiodochelidamate (Neo-Iopax), 50% aqueous solution, are mixed with 20 cc. of a glucose polymer (dextran) of an average molecular weight of 65,000 in a concentration of 17.5%. The resulting mixture is a pale yellow, viscous, clear liquid showing a viscosity at 24° C. in an ASTM D-445 No. 400 viscosimeter of 32 seconds.

*Example II*

50 cc. of disodium N-methyl-3,5-diiodochelidamate, 50% aqueous solution, are mixed with 50 cc. of a glucose polymer (dextran) of an average molecular weight of 65,000 in a concentration of 17.5%. The resulting mixture is a pale yellow, viscous, clear liquid showing a viscosity at 24°, determined as in Example I, of 3 minutes and 50 seconds.

*Example III*

80 cc. of disodium N-methyl-3,5-diiodochelidamate, 75% aqueous solution, are mixed with 20 cc. of a glucose polymer of an average molecular weight of 65,000 in a concentration of 17.5%. The resulting mixture is a pale yellow, viscous, clear liquid showing a viscosity at 22°, determined as in Example I, of 54 seconds.

*Example IV*

50 cc. of a 35% solution of 3,5-diiodo-4-pyridone-N-acetic acid diethanolamine salt are mixed with 50 cc. of a glucose polymer of an average molecular weight of 65,000 in a concentration of 17.5%.

*Example V*

50 cc. of a 50% aqueous solution of sodium o-iodohippurate (Hippuran) are mixed with 50 cc. of a glucose polymer of an average molecular weight of 60,000 in a concentration of 17.5%.

*Example VI*

50 cc. of a 67% aqueous solution of sodium 2,4,6-triiodo-3-acetylamino benzoate are mixed with 50 cc. of a glucose polymer of an average molecular weight of 65,000 in a concentration of 17.5% and 100 cc. of water.

*Example VII*

50 cc. of a 67% aqueous solution of sodium 2,4,6-tribromo-3-acetylamino-benzoate are mixed with 50 cc. of a glucose polymer of an average molecular weight of 65,000 in a concentration of 17.5% and 100 cc. of water.

*Example VIII*

50 cc. of a 10% aqueous solution of disodium-α-phenyl-β-(3,5-diiodo-4-hydroxyphenyl) propionate are mixed with 50 cc. of a glucose polymer of an average molecular weight of 65,000 in a concentration of 17.5%.

*Example IX*

80 cc. of disodium N-methyl-3,5-diiodochelidamate (Neo-Iopax), 75% aqueous solution, are mixed with 20 cc. of a glucose polymer of an average molecular weight of 150,000 in a concentration of 17.5% and 100 cc. of water.

*Example X*

80 cc. of a 50% aqueous solution of the sodium salt of 3,5-diiodo-4-hydroxybenzenesulfonic acid are mixed with 20 cc. of a glucose polymer of an average molecular weight of 65,000 in a concentration of 17.5%.

*Example XI*

80 cc. of a 25% aqueous solution of the diethanolamine salt of 2,4-dioxo-3-iodo-6-methyl-tetrahydropyridine-N-acetic acid are mixed with 20 cc. of a glucose polymer of an average molecular weight of 65,000 in a concentration of 17.5%.

*Example XII*

50 cc. of a 50% solution of the sodium salt of 3,5-diiodopyridine-4-sulfonate are mixed with 50 cc. of a glucose polymer of an average molecular weight of 65,000 in a concentration of 17.5%.

*Example XIII*

104 cc. of disodium N-methyl-3,5-diiodochelidamate, 75% aqueous solution, are mixed with 20 cc. of a glucose polymer of an average molecular weight of 65,000 in a concentration of 17.5% and 76 cc. of water added. Using the same type of tube as in Example 1, No. 200 at 22°, the viscosity was 1 minute and 57 seconds.

*Example XIV*

104 cc. of disodium N-methyl-3,5-diiodochelidamate, 75% aqueous solution, are mixed with 25 cc. of a glucose polymer of an average molecular weight of 65,000 in a concentration of 17.5% and 71 cc. water. The material has a viscosity of 2 minutes and 17 seconds using the tube and temperature given in Example XIII.

*Example XV*

50 cc. of a 10% aqueous solution of disodium-α-phenyl-β-(3,5-diiodo-4-hydroxy phenyl) propionate are mixed with 30 cc. of a glucose polymer of an average molecular weight of 100,000 in a concentration of about 17.5%, and 20 cc. of water added.

I have found that the above preparations are stable indefinitely and can be marketed in the form of solutions. The dextran in no way interferes with the action of the contrast agent, and the mixture has sufficient wetting action to insure distribution of the diagnostic material over the whole of the area to be examined; and upon the spraying of the roentgenographic preparation it will spread to the remotest cavities and thus reliably insure a complete X-ray picture.

The usefulness of the dextran in a roentgenographic preparation is not restricted to any particular type of diagnostic agent and it can therefore be employed with radiopaque compounds generally which are soluble in water. Thus, in addition to the contrast agents named in the above examples, the following substances also may be used: α - cyclohexyl - β - (3,5 - diiodo - 4 - hydroxyphenyl) propionic acid, 2 - (3,5 - diiodo - 4 - hydroxybenzyl) benzoic acid, α - phenyl - 3,5 - diiodo - 4 - hydroxy cinnamic acid, α - ethyl - β - (3,5 - diiodo - 4 - hydroxyphenyl) propionic acid, α - (p - iodo phenyl) - p - iodo cinnamic acid, α - butyl - β - (3,5 - diiodo - 4 - amino phenyl) propionic acid, 3 - iodo - 4 - methoxy cinnamic acid, 3,5 - diiodo - 4 - hydroxy benzoic acid, 3,5 - diiodo - 4 - hydroxy dihydro - α - stilbazole, and 3,5 - diiodotyrosine.

The presence of the dextran does not alter the known field of use of the individual opacyifying agents. Thus, where any particular agent is employed intravenously, the same can be injected intravenously also when mixed with dextran in accordance with the present invention; while contrast agents whose use was generally limited to the spraying of externally accessible membranes or cavities, or to the filling of cavities, can be used in exactly the same way with dextran, the molecular weight of the dextran being preferably chosen with the considerations above mentioned in view.

In the above examples, the proportion of dextran in the roentgenographic solutions ranges from about 2 to 10 grams per 100 cc. of solution, which, depending on the character of the radiopaque compound and its manner of use, contains about 5 to 60 grams of such compound. The proportion of dextran can, however, vary from about 1 to 20 grams per 100 cc. of radiopaque solution. In any particular case the quantity of the glucose polymer is so determined that a roentgenographic solution is obtained in which the rate of diffusion in the blood stream or the rate of absorption into the blood stream is materially reduced. Regardless of the quantity of the polymer that is present in the solution, the danger of an entrapment of air bubbles in the roentgenographic solution is greatly diminished by the presence of the polymer and is in fact practically eliminated.

I claim:

1. A roentagenographic preparation comprising an aqueous mixture of a water-soluble contrast agent and a dextran of an average molecular weight of about 25,000 to 70,000.

2. A roentgenographic preparation comprising an aqueous mixture of a water-soluble contrast agent and from about 1% to 20% of a dextran of an average molecular weight of about 25,000 to 70,000.

3. A preparation as defined in claim 1, wherein the dextran has an average molecular weight of about 40,000 to 65,000.

4. A roentgenographic preparation for spraying onto body membranes and comprising an aqueous solution of a water-soluable contrast agent and a sufficient amount of a water-dispersible dextran of an average molecular weight of about 25,000 to 70,000 to form a viscous film of the preparation on said membrane.

5. An aqueous roentgenographic preparation for intravenous injection characterized by a low degree of diffusibility and comprising an aqueous solution of an injectable contrast agent containing a water-dispersible dextran of an average molecular weight of about 25,000 to 70,000.

6. A roentgenographic preparation comprising an aqueous solution of a water-dispersible dextran of an average molecular weight of about 25,000 to 70,000 and an alkali metal salt of N-methyl-3,5-diiodo-chelidamic acid.

7. A roentgenographic preparation comprising an aqueous solution of a water-dispersible dextran of an average molecular weight of about 25,000 to 70,000 and an alkali metal salt of 2,4,6-triiodo-3-acetylamino-benzoic acid.

8. A roentgenographic preparation comprising an aqueous solution of a water-dispersible dextran of an average molecular weight of about 25,000 to 70,000 and an alkali metal salt of 2,4,6-tribromo-3-acetylamino-benzoic acid.

9. A roentgenographic preparation comprising an aqueous solution of a water-dispersible dextran of an average molecular weight of about 25,000 to 70,000 and an alkali metal salt of $\alpha$-phenyl-$\beta$-(3,5-diiodo-4-hydroxyphenyl) propionic acid.

10. A roentgenographic preparation comprising an aqueous solution of a water-dispersible dextran of an average molecular weight of about 25,000 to 70,000 and the diethanolamine salt of 3,5-diiodo-4-pyridone-N-acetic acid.

References Cited in the file of this patent

UNITED STATES PATENTS

| Number | Name | Date |
|---|---|---|
| 1,919,417 | Dohrn | July 25, 1933 |
| 2,436,967 | Leuck | Mar. 2, 1948 |
| 2,437,518 | Gronwall et al. | Mar. 9, 1948 |

FOREIGN PATENTS

| Number | Country | Date |
|---|---|---|
| 480,721 | Great Britain | Feb. 28, 1938 |
| 688,649 | Germany | Feb. 27, 1940 |

OTHER REFERENCES

Einsel: Surgery, Gynecology and Obstetrics Abstracts, November 1943, page 438.

Schulze: Manufacturing Chemist, January 1935, pages 5 to 7.

Gronwall: Nature, vol. 155, page 45 (January 13, 1945).

Elliott: Pharmaceutical Journal, April 18, 1942, page 141.

The Lancet, "Dextran as a Plasma Substitute," January 22, 1949, pages 132–143.